(12) United States Patent
Chen

(10) Patent No.: US 7,406,090 B2
(45) Date of Patent: Jul. 29, 2008

(54) MANAGING A BUFFER FOR MEDIA PROCESSING

(75) Inventor: Ling Chen, Livingston, NJ (US)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 10/611,616

(22) Filed: Jun. 30, 2003

(65) Prior Publication Data

US 2004/0264473 A1    Dec. 30, 2004

(51) Int. Cl.
*G06F 12/00*    (2006.01)
*G06F 13/00*    (2006.01)
*H04L 12/54*    (2006.01)
*H04J 3/06*    (2006.01)

(52) U.S. Cl. .............. 370/412; 370/395.4; 370/413; 370/415; 370/417; 370/419; 370/428; 370/509; 370/512; 711/147; 379/406.1

(58) Field of Classification Search .......... 710/52–57; 711/147
See application file for complete search history.

(56) References Cited

U.S. PATENT DOCUMENTS

| | | | | | |
|---|---|---|---|---|---|
| 5,461,679 | A | * | 10/1995 | Normile et al. | 382/304 |
| 5,596,645 | A | * | 1/1997 | Fujimori | 381/17 |
| 5,959,689 | A | * | 9/1999 | De Lange et al. | 348/571 |
| 5,978,868 | A | * | 11/1999 | Maas | 710/52 |
| 6,400,709 | B1 | * | 6/2002 | Yousseff | 370/352 |
| 6,463,486 | B1 | * | 10/2002 | Parry et al. | 710/52 |
| 6,807,589 | B2 | * | 10/2004 | Apfeldorfer et al. | 710/52 |
| 2003/0187824 | A1 | * | 10/2003 | MacInnis et al. | 707/1 |

* cited by examiner

*Primary Examiner*—Tanh Q Nguyen
(74) *Attorney, Agent, or Firm*—Kacvinsky LLC

(57) ABSTRACT

A method and apparatus to perform buffer management for media processing are described.

10 Claims, 6 Drawing Sheets

MANAGING A BUFFER FOR MEDIA PROCESSING

BACKGROUND

Voice over packet (VOP) technology may be directed to communicating voice information over a packet network. A VOP network may utilize various components to process the voice information as it passes through the network. Latency incurred by the voice information as it passes through the components may affect the quality of a telephone call completed over the VOP network. Some of the latency may be caused by the use of multiple buffers by the components. If the number of buffers is reduced then the quality of the telephone call may improve. Consequently, there may be a need for improved buffer management techniques to reduce latency in a VOP system.

BRIEF DESCRIPTION OF THE DRAWINGS

The subject matter regarded as embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to perform buffer management for a media processing device. The media processing device may comprise a plurality of components designed to process audio information communicated by a VOP network. The term "audio information" as used herein may refer to any information communicated during a telephone call, such as voice, speech, speech fragments, tone information, silent periods, comfort noise, background noise, music, and so forth. In one embodiment, audio information may be stored in a circular buffer. A schedule may be created to access the audio information stored in the circular buffer by the components. The components may access the information in accordance with the schedule. Using a shared buffer for multiple components may result in lower overall latency for the audio information processed by the component. The result may be a higher Quality of Service (QoS) for telephone calls completed over a VOP network.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

It is also worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
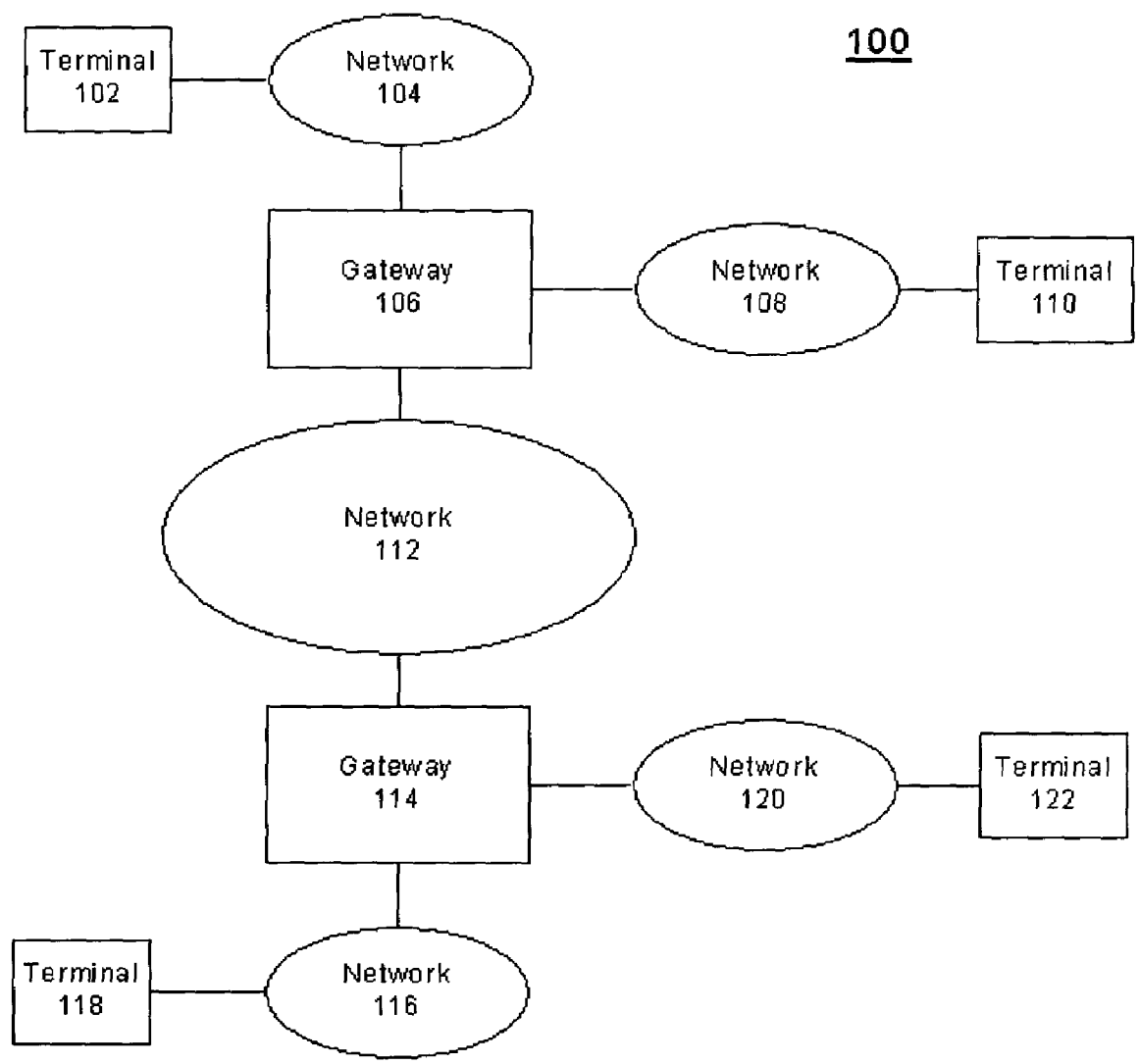
FIG. 1 illustrates a network in accordance with one embodiment.

Referring now in detail to the drawings wherein like parts are designated by like reference numerals throughout, there is illustrated in FIG. 1 a network suitable for practicing one embodiment. FIG. 1 is a block diagram of a network 100 comprising a number of network nodes connected by various communications mediums. A network node in this context may include any device capable of communicating information, such as a call terminal, computer, server, switch, router, bridge, gateway, personal digital assistant (PDA), mobile device, and so forth. Examples of a communications medium may include any medium capable of carrying information signals, such as twisted-pair wire, co-axial cable, fiber optics, radio frequencies, liquids and so forth. It may be further appreciated that the terms "connection" and "interconnection," and variations thereof, in this context may refer to physical connections and/or logical connections. Although FIG. 1 shows a limited number of network nodes for clarity, it can be appreciated that any number of network nodes may be used in network 100 and still fall within the scope of the invention.

More particularly, network 100 may include network nodes 102, 110, 118 and 122. In one embodiment, network nodes 102, 110, 118 and 122 may be call terminals. A call terminal may comprise any device capable of communicating audio information, such as a telephone, a packet telephone, a mobile or cellular telephone, a processing system equipped with a modem or Network Interface Card (NIC), and so forth. In one embodiment, the call terminals may have a microphone to receive analog voice signals from a user, and a speaker to reproduce analog voice signals received from another call terminal.

Network 100 may also include various types of networks, such as networks 104, 108, 112, 116 and 120. In one embodiment, networks 104 and 116 may be voice networks. The term "voice network" may refer to a circuit-switched network, such as the Public Switched Telephone Network (PSTN). A circuit-switched network typically establishes a dedicated communications channel or circuit between call terminals. In one embodiment, networks 108, 112 and 120 may be data networks. The term "data network" may refer to a packet network, such as the Internet. Packet networks may be described in more detail below.

In one embodiment, networks 108, 112 and 120 may comprise packet networks. A packet network may comprise one or more network nodes that communicate information as a stream of relatively short packets. A packet in this context may refer to a set of information of a limited length, with the length typically represented in terms of bits or bytes. In general operation, a network node may receive the audio information, and break it up into a series of audio packets. Each packet may comprise a portion of the audio information and control information. The network node may then send the audio packets in sequence to another network node. This process may be repeated until the entire series of packets exit the network or reaches their intended destination.

Each network in network 100 may communicate audio packets in accordance with one or more communications protocols. A protocol may comprise a set of instructions, rules or specifications by which the information signals are communicated over the communications medium. In one embodiment of the invention, for example, networks 108, 112 and 120 may operate in accordance with one or more Internet protocols such as the Internet Engineering Task Force (IETF) document titled "Transmission Control Protocol," Standard 7, Request For Comment (RFC) 793, September, 1981 ("TCP Specification"); and the IETF document titled "Internet Protocol," Standard 5, RFC 791, September, 1981 ("IP Specification").

Networks 108, 112 and 120 may also operate in accordance with one or more VOP protocols, such as the International Telecommunications Union (ITU) document titled "Packet-based Multimedia Communication Systems," Recommendation H.323, November 2000 and available from "www.itu.int" ("H.323 Specification"); the IETF document titled "SIP: Session Initiation Protocol," Proposed Standard, RFC 2543, March 1999 ("SIP Specification); the ITU document titled "Gateway Control Protocol, Version 2," Recommendation H.248.1, May 2002 ("Megaco Specification"); the IETF document titled "RTP Payload for DTMF Digits, Telephony Tones and Telephony Signals," Proposed Standard, RFC 2833, May 2000 ("RFC 2833 Specification"); and the IETF document titled "RTP: A Transport Protocol For Real Time Applications," Proposed Standard, RFC 1889, January 1996 ("RTP Specification").

Although a few example protocols are discussed herein, it may be appreciated that the embodiments of the invention are not limited in this context. Further, packet networks 108, 112, and 120 may also include the appropriate interfaces to circuit-switched networks such as networks 104 and 116, and vice-versa.

In one embodiment, network 100 may further comprise network nodes 106 and 114. In one embodiment, networks node 106 and 114 may comprise gateways or media gateways. Media gateways 106 and 114 may operate to convert a conventional telephony call to a packet telephony call or VOP call. For example, media gateways 106 and 114 may receive signals from a circuit-switched network, such as networks 104 and 116, and convert the circuit-switched signals into packets. The conversion to packets may be made in accordance with, for example, the TCP/IP Specification, SIP Specification, H.323 Specification, Megaco Specification or other packet protocol. Media gateways 106 and 114 may also receive signals from a packet network, such as networks 108, 112 and 120, and convert the packets into circuit-switched signals or pass them to another packet network.

Network 100 may complete a telephone call between call terminals, such as call terminals 102, 110, 118 and 122. The communication path between certain call terminals may comprise both circuit-switched networks and packet networks, as demonstrated by a telephone call between call terminals 102 and 118, for example. The communication path between certain call terminals may comprise only packet networks, as demonstrated by a telephone call between call terminals 110 and 122, for example. In both cases, a portion of the communication path traverses a packet network. Completing a telephone call over a packet network may introduce the need for buffer management as discussed previously.

In general operation, assume call terminal 102 dials the telephone number for call terminal 118. Network 104 receives the telephone number and initiates a call connection. After a call connection is set-up, call terminal 102 may begin communicating audio information over network 104 to gateway 106. Gateway 106 may convert the audio information represented as circuit-switched signals into packets for transport over network 112. Gateway may convert the audio information into packets and send them to gateway 114. Gateway 114 may receive the packets, often out of order due to the varying network delays experienced by the different packets, and reassembles them as they are received. The packets are then converted back to audio information represented as Pulse Code Modulated (PCM) signals, and the circuit-switched signals are conveyed through network 116 to call terminal 118.

In one embodiment, a telephone call similar to above may be completed without any portion of the audio information traveling over a circuit-switched network such as networks 104 and 116. For example, call terminal 110 may communicate audio information over a call connection with call terminal 122. Call terminal 110 may convert the analog audio signals into digital audio information, and place the audio information into packets. The packets may pass through networks 108, 112 and 120, until they reach call terminal 122. Call terminal 122 may reconstruct the audio information in the form of analog audio signals for conveyance to the listening party. In this case, the embodiments may be implemented in call terminals 110 and 122, for example.

Figure 2:
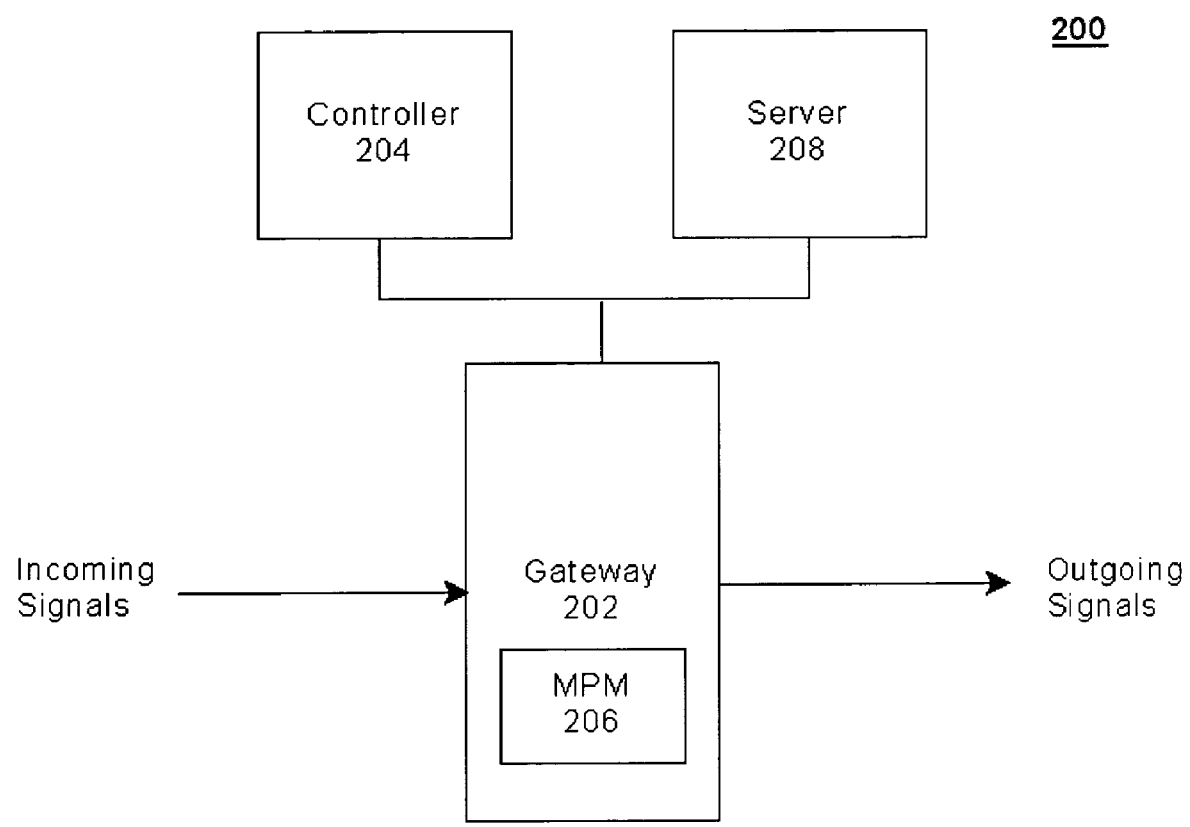
FIG. 2 illustrates a block diagram of a VOP system suitable for use with one embodiment.

FIG. 2 is a block diagram of a processing system in accordance with one embodiment. FIG. 2 may illustrate a processing system 200. Processing system 200 may implement functionality for the various embodiments as software executed by a processor, hardware circuits or structures, or a combination of both. The processor may be a general-purpose or dedicated processor, such as a processor made by Intel Corporation, Motorola Incorporated, Sun Microsystems Incorporated, Compaq Computer Corporation and others. The processor may also be a specialized processor, such as a digital signal processor (DSP) with accompanying architecture, a network processor, embedded processor, micro-controller, controller and so forth. The software may comprise programming logic, instructions or data to implement certain functionality for an embodiment. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment, the media may store programming instructions in a compressed and/or encrypted format, as well as instructions that may have to be compiled or installed by an installer before being executed by the processor. Alternatively, an embodiment may be implemented as specific hardware components that contain hard-wired logic for performing the recited functionality, or by any combination of programmed general-purpose computer components and custom hardware components.

In one embodiment, processing system 200 may implement some functionality for a gateway. System 200 may implement functionality for a gateway, such as gateways 106 and 114, for example. Although this functionality is shown as part of gateways 106 and 114, it can be appreciated that this functionality can be implemented in any device connected to systems 100 or 200, and still fall within the scope of the embodiments. For example, in the case of completing a telephone call between call terminals 110 and 122, processing system 200 may be implemented in call terminals 110 and 122 instead of gateways 106 and 114, respectively, as desired for a particular implementation. In another example, system 200 may be implemented as part of an application server for a gateway, such as server 208.

In one embodiment, gateway 200 may comprise an element 202. Element 202 of system 200 may comprise, for example, a media gateway 200 that may operate to convert a conventional telephony call to a packet telephony call or VOP call. In one embodiment, gateway 202 may receive signals from a circuit-switched network and convert them to packet voice signals. An example of a circuit-switched network may be the PSTN. An example of signals communicated via a circuit-switched network may comprise PCM signals. The conversion to packets may be made in accordance with, for example, any number of protocols, such as the RTP Specification and others. Gateway 202 may communicate both call control packets and packet voice signals through other components of system 200 until the packets reach their intended destination, e.g., a call terminal connected to system 200.

In one embodiment, gateway 200 may also comprise an element 204. Element 204 of system 200 may comprise, for example, a media gateway controller or gatekeeper to perform conventional call processing functions, such as address translation, admission control, call control signaling, call authorization, call management and so forth in accordance with any appropriate call processing protocol, such as the Megaco Specification, for example. Controller 204 may communicate with gateway 202 via call control packets to perform such call processing functions. In one embodiment, controller 204 may provide address and routing information to communicate packets through system 200 to the destination call terminal, such as call terminal 106.

In one embodiment, gateway 200 may also comprise an element 208. Element 208 of gateway 200 may be, for example, an application server. An example of an application server may be a conferencing server or a Multipoint Control Unit (MCU) for a VOP system. Server 208 may implement conventional MCU, multipoint controller (MC) and multipoint processor (MP) functions in accordance with the H.323 Specification, and may also implement general conference control (GCC) and multipoint communication service (MCS) functions. Server 208 may process a multipoint conference call, and may depacketize encapsulated packets of multiple streams of multimedia information to form a multimedia conferencing session. For example, server 208 may receive various streams of audio information and multiplex/demultiplex the streams together to enable various call terminals to communicate audio information between each other for a conference call session.

In one embodiment, gateway 202 may also include a Media Processing Module (MPM) 206. MPM 206 may process audio information for a network node, such as a gateway, media server, call terminal, and so forth. MPM 206 on the in-bound path may consist of a number of components, such as an echo canceller (EC), voice encoder, signal detector and generator (SDG), automatic gain control (AGC), voice activity detector (VAD), and so forth. MPM 206 on the out-bound path may consist of a number of components, such as a data modem, SDG, Automatic Volume Control (AVC), voice decoder, and so forth. The type and number of components may vary according to a particular implementation, and the embodiments are not limited in this context.

Designing a MPM for a VOP network may be a significant challenge. In order to ensure that a MPM performs in accordance with the requirements of a particular system or device, three design issues should be addressed. The first design issue attempts to reduce processing latency when the audio information passes through the components, since latency is a key factor affecting service quality in VOP systems. The second design issue attempts to keep each component as independent as possible in order to reduce the integration complexity. The third design issue attempts to efficiently share hardware resources among the components. An example of hardware resources might be memory. The third design issue may be particularly important for resource-constrained, high-density devices.

Design solutions often solve one design issue at the expense of another design issue. For example, buffers may be needed to keep components independent. Buffers may introduce, however, additional latency and memory requirements. In another example, two components may be tightly coupled to each other to reduce latency. The tight coupling, however, may increase integration complexity.

Buffer management may be particularly important in a given design solution. The complete data processing path in the MPM may consist of several cascaded DSP components. The DSP components may process audio information in the form of digitized audio signals. A DSP component often processes the audio information in the form of frames. The term "frame" as used herein may refer to a block of data from the audio information. The frame may also have a frame size. The term "frame size" as used herein may refer to a time period for the audio information. For example, the frame size for a frame may typically vary between 5 and 30 milliseconds (ms). The DSP components may typically process one frame at a time. Further, DSP components may typically use multiple tasks or threads with different execution periods to process frames of varying sizes. As a result, the DSP components may need buffers between each component to exchange data between tasks. Each additional buffer may introduce additional latency and memory requirements.

The embodiments attempt to solve these and other design issues by using one or more shared buffers for the MPM. By reducing the number of buffers needed by the MPM, the latency for the system may be reduced and memory usage may become more efficient. The reduced latency may be allocated to other design issues, such as allowing the components to be more independent and thereby reducing integration complexity. As a result, the use of a shared buffer may improve the quality of a telephone call completed over a VOP system.

Figure 3:
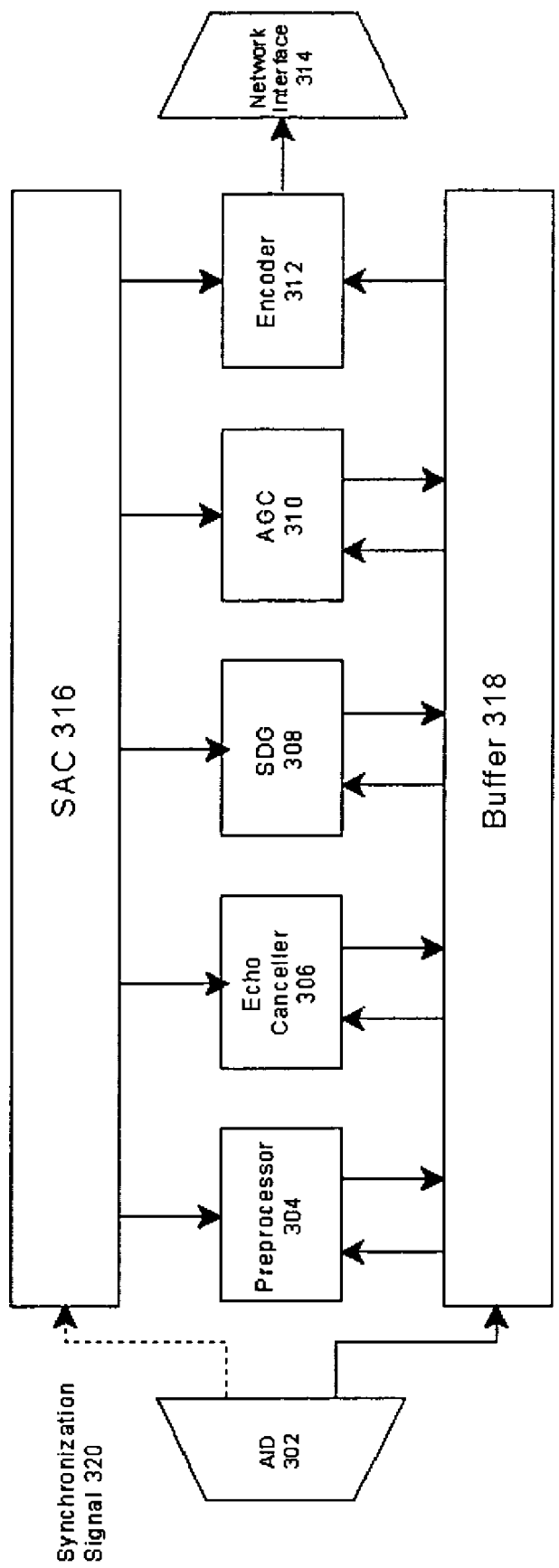
FIG. 3 illustrates a block diagram of a Media Processing Module (MPM) for an in-bound data path in accordance with one embodiment.

FIG. 3 illustrates a block diagram of a MPM for an in-bound data path in accordance with one embodiment. FIG. 3 illustrates a MPM 300 that may be representative of MPM 206, for example. MPM 300 may illustrate a MPM as used for an in-bound data path for clarity. The principles discussed with respect to the in-bound data path may also be used for the out-bound data path as well. This may be discussed with reference to FIG. 4. In practice, a buffer as described herein may be implemented for each direction (i.e., in-bound and out-bound) per channel.

In one embodiment, MPM 300 may comprise a plurality of media processing components, such as a preprocessor 304, an EC 306, a SDG 308, an AGC 310 and a voice encoder 312, for example. MPM 300 may further comprise a Scheduler and Access Controller (SAC) 316, a Frame-Synchronized Sharing (FSS) buffer 318 and a network interface 314. In addition, MPM 300 may further comprise an Audio Data Module (ADM). In one embodiment, the ADM may comprise, for example, an Audio Input Device (AID) 302. In one embodiment, the various elements of MPM 300 may be implemented as DSPs and accompanying architecture, although the embodiments are not limited in this context.

The various components of MPM 300 may perform media processing on audio information as it passes between an audio input source and a packet interface, and vice-versa. The components may be cascaded, which means that the audio information is processed by each component in sequence. In one embodiment, preprocessor 304 may perform preprocessing operations on the audio information. The preprocessing operations may comprise, for example, filtering using a high-pass or low-pass filters, data format conversion, and so forth. An example of data format conversion may be from A-law or μ-law non-linear formats to a linear format. EC 306 may perform echo-cancellation to reduce background noise and remove hybrid and acoustic echo before any transcoder processing. SDG 308 may be used to perform signal detection, such as tone signals. SDG 308 may also perform tone detecting and masking. AGC 310 may assist in maintaining the audio signals at a certain predetermined level. Encoder 312 may compress the audio information to reduce the number of bits needed to represent the audio information. The encoder may operate in accordance with any type of voice codec, such as a G.726 Adaptive Differential Pulse Code Modulation (ADPCM) coder, a G.728 Low Delay Code-Book Excited Linear Predictive (LD-CELP) coder, G.729 Conjugate-Structure Algebraic Code-Book Excited Linear Predictive coder (CS-ACELP), G.723.1 Multi Rate Coder, and so forth. The number and type of components used by MPM 300 may vary according to a particular implementation, and the embodiments are not limited in this context.

In on embodiment, network interface 314 may take encoded audio information and continue converting the audio information into packets. For example, the audio information may be converted into packets in accordance with the TCP/IP Specification or RTP Specification. The packets may then be transported over a packet network, such as network 112.

In one embodiment, MPM 300 may receive audio information as a result of a telephone call between call terminals 102 and 118, for example. AID 302 may receive the audio information. AID 302 may store the received audio information in FSS buffer 318. AID 302 also sends a synchronization signal 320 to SAC 316 to assist SAC 316 in scheduling when and where a component may access the audio information stored in FSS buffer 318. In addition, AID 302 may also be programmed with the various frame sizes and frame boundaries for the components of MPM 300. As AID 302 stores information in FSS buffer 318, AID 302 monitors to detect whether the storage location corresponds to a frame boundary for one of the components. If the storage location does correspond to a frame boundary for one of the components, then AID 302 may pass a signal with the frame boundary to SAC 316.

SAC 316 may receive the synchronization signal 320. SAC 316 may use the synchronization signal to generate a schedule to determine when one or more components may access FSS buffer 318. The schedule may vary in accordance with a number of factors. For example, in one embodiment SAC 316 may schedule the components to access a frame of audio information from FSS buffer 318 on a periodic basis. The period may vary for each component based on frame size used by the component. For example, EC 306 may use a frame size of 10 ms frames. Thus, every time 10 ms worth of information is stored in FSS buffer 318, EC 306 may "wake up" and access a frame of audio information from FSS buffer 318. In another example, components with a smaller frame size may be given a higher priority than components with a larger frame size. Higher priority execution can preempt lower priority ones. For components using the same frame size, the execution order may be consistent with the logic data flow of the data path. For example, signal detector 308 may be executed following EC 306 if they have the same frame size.

The scheduling technique implemented for SAC 316 combined with the buffer access control may reduce or eliminate the integration dependency between components. For instance, signal detector 308 and encoder 312 do not necessarily need to know the existence of EC 306 to use echo cancelled data generated by EC 306, even though they may be executed by different tasks due to the different frame sizes. To ensure efficient data access, it may be a design constraint to have the components using smaller frame sizes to be in the earlier processing stages, and the components using larger frame sizes to be in the later processing stages, although the embodiments are not limited in this context.

FSS buffer 318 may be used to store audio information received by AID 302. In one embodiment, FSS buffer 318 may be a circular buffer. A circular buffer may be an area of memory or a hardware buffer used to store a continuous stream of data by starting again at the beginning of the buffer after reaching the end. A circular buffer is usually written by one process and read by another. Separate read and write pointers are maintained. These are typically not allowed to pass each other otherwise either unread data would be overwritten or invalid data would be read.

The size of buffer 318 may vary in accordance with a number of factors. First, the buffer size should be a multiple of any of the frame sizes used by the components. Second, the buffer size should be at least twice as big as the maximal frame size used by MPM 300. For example, assume the components have the frame sizes of 5, 10, 20 and 30 ms frames, which are common in many DSP algorithms. In this case, the buffer can be viewed as a number of contiguous frames of any of the frame sizes, with a maximum buffer size of at least 60 ms. This may be described in more detail with reference to FIG. 4.

Figure 4:
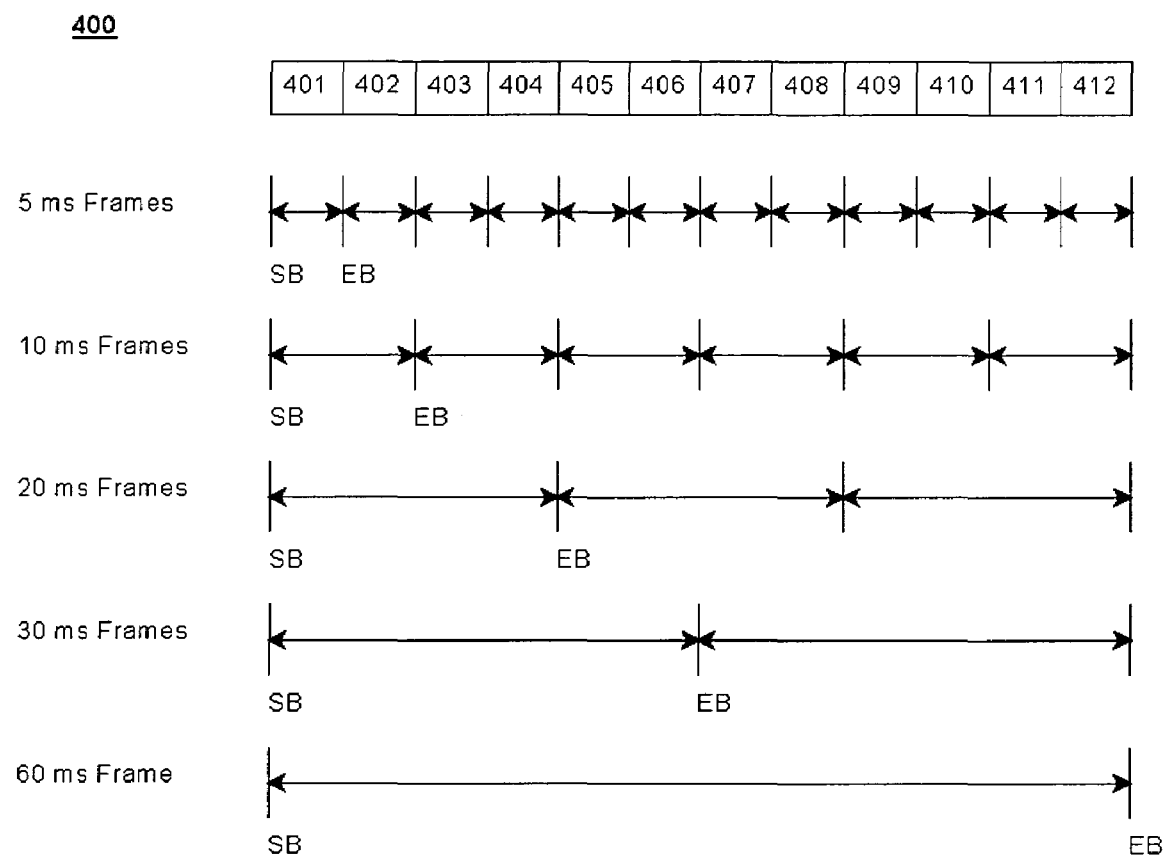
FIG. 4 may illustrate a theoretical buffer for use with a MPM in accordance with one embodiment.

FIG. 4 may illustrate a theoretical buffer in accordance with one embodiment. FIG. 4 may illustrate a FSS buffer 400 that may be representative of, for example, FSS buffer 318. FSS buffer 400 may comprise multiple buffer locations 401-412. The buffer locations may be used to define frames of various frame sizes. For example, buffer locations 401-412 may be broken down into 12 frames of 5 ms each, 6 frames of 10 ms each, 3 frames of 20 ms each, 2 frames of 30 ms each, and one frame of 60 ms. Each frame may have a set of frame boundaries, with the Start Boundary (SB) being represented by the left edge of the frame, and the End Boundary (EB) being represented by the right edge of the frame. It may be appreciated that the EB for one frame may be the SB for the next contiguous frame. It may be further appreciated that the frames sizes, frames and number of buffer locations are provided by way of example, and the embodiments are not limited in this context.

Access to the individual frames within FSS buffer 400 may be managed using an index for each frame size. For example, assume that the frame size for preprocessor 304 is 10 ms per frame. FSS buffer 400 may hold 6 frames of 10 ms each. After FSS buffer 400 is initialized and begins to receive audio information, the index for preprocessor 304 may be set to point to buffer location 401. When AID 302 fills buffer locations 401 and 402 with audio information, it may send a synchronization signal with a frame boundary 402 to SAC 316. SAC 316 will send a control signal to preprocessor 304 to read a 10 ms frame of audio information starting with buffer location 401. Preprocessor 304 will process the 10 ms frame of audio information, and write the processed audio information back to buffer locations 401 and 402. SAC 316 may then update the index for preprocessor 304 to point to the next 10 ms frame in FSS buffer 400, which in this example would be buffer location 403. The index may be updated through all 6 frames (i.e., 401/402, 403/404, 405/406, 407/408, 409/410 and 411/412) until the end of FSS buffer 400 is reached. Since FSS buffer 400 is a circular buffer, the index would be reset to the first 10 ms frame in FSS buffer 400, or buffer location 401. Each component would have its own index, and SAC 316 would manage the indices in accordance with the synchronization signals received from AID 302.

In general operation, AID 302 may receive the audio information and begin filling FSS buffer 318. Since FSS buffer 318 is a circular buffer, AID 302 will wrap back to the beginning of FSS buffer 318 (e.g., buffer location 401) when it reaches the end of FSS buffer 318 (e.g., buffer location 412). AID 302 also generates synchronization signals to pass the frame boundaries to SAC 316. SAC 316 would receive the synchronization signal and frame boundaries and determine which component should access FSS buffer 318. SAC 316 would send a control signal to each component to indicate when the component should access FSS buffer 318. The components may read and/or write one frame from/to the buffer location per time period as indicated by the corresponding index. SAC 316 may update the index whenever AID 302 passes the corresponding frame boundary. The index may be set to the first frame boundary ahead of the one AID 302 just filled. In this manner, the components may access the more recent audio information while reducing extra latency introduced by the algorithm.

Figure 5:
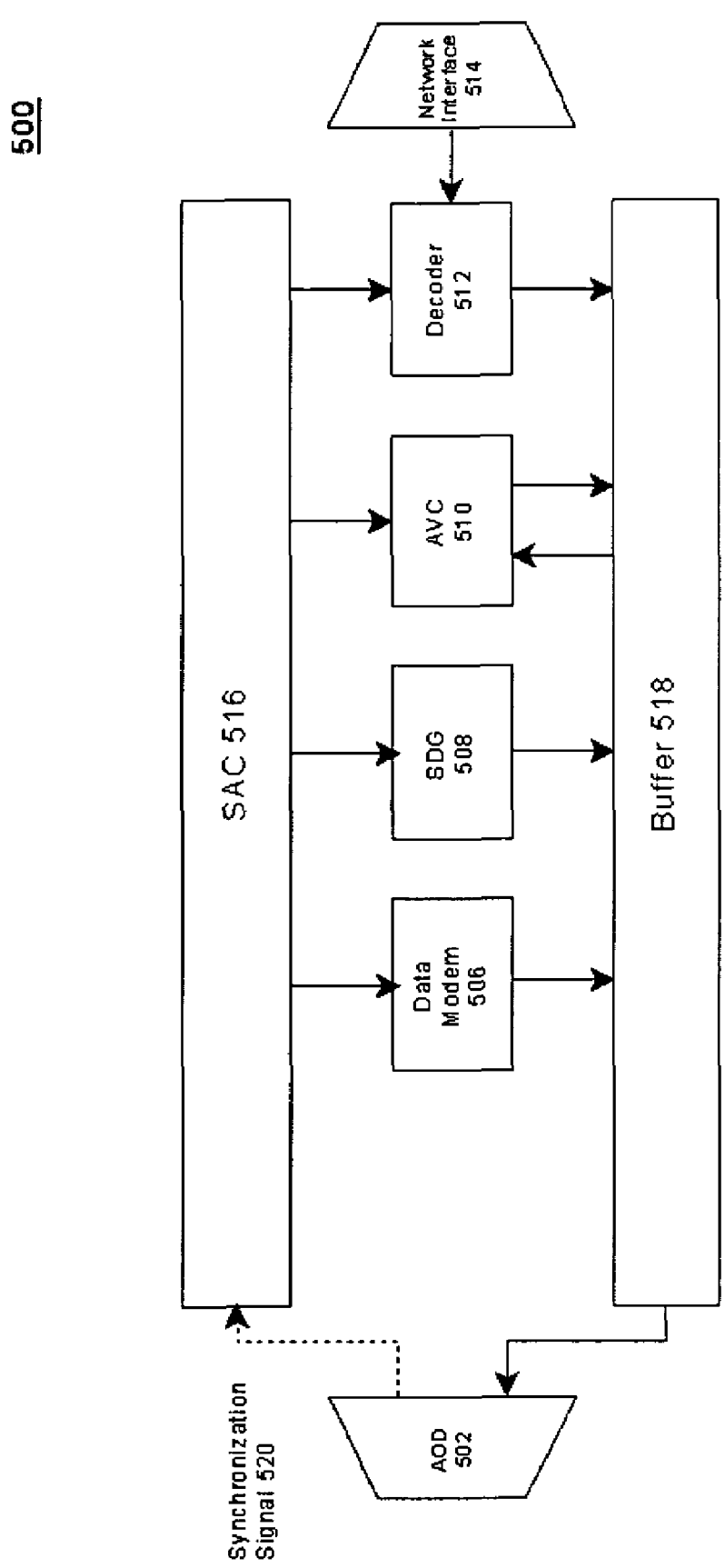
FIG. 5 illustrates a block diagram of a MPM for an outbound data path in accordance with one embodiment.

FIG. 5 illustrates a block diagram of a MPM for an outbound data path in accordance with one embodiment. FIG. 5 illustrates a MPM 500 that may be representative of MPM 206, for example. MPM 500 may illustrate a MPM as used for an out-bound data path. The principles discussed with respect to the in-bound data path may also be used for the out-bound data path as well.

In one embodiment, MPM 500 may comprise a plurality of media processing components, such as a data modem 506, a SDG 508, an AVC 510, and a voice decoder 512, for example. MPM 500 may further comprise a SAC 516, a FSS buffer 518 and a network interface 514. In addition, MPM 500 may further comprise an ADM. In one embodiment, the ADM may comprise, for example, an Audio Output Device (AOD) 502. In one embodiment, the various elements of MPM 500 may be implemented as DSPs and accompanying architecture, although the embodiments are not limited in this context.

In operation, MPM 500 may operate in a similar manner to MPM 300, with a few modifications. For example, AOD 502 may read FSS buffer 518. In another example, the index for each component may be set to the first frame boundary ahead of the one that AOD 502 just passed. In all other respects, the principles, structures and operations discussed with respect to MPM 300 may also apply to MPM 500. For example, elements 502, 514, 516 and 518, as well as synchronization signal 520 as shown in FIG. 5, may correspond in structure and function to elements 302, 314, 316 and 318, as well as synchronization signal 320, respectively, as discussed with reference to FIG. 3.

The operations of systems 100, 200, 300 and 500 may be further described with reference to FIG. 6 and accompanying examples. Although FIG. 6 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 6:
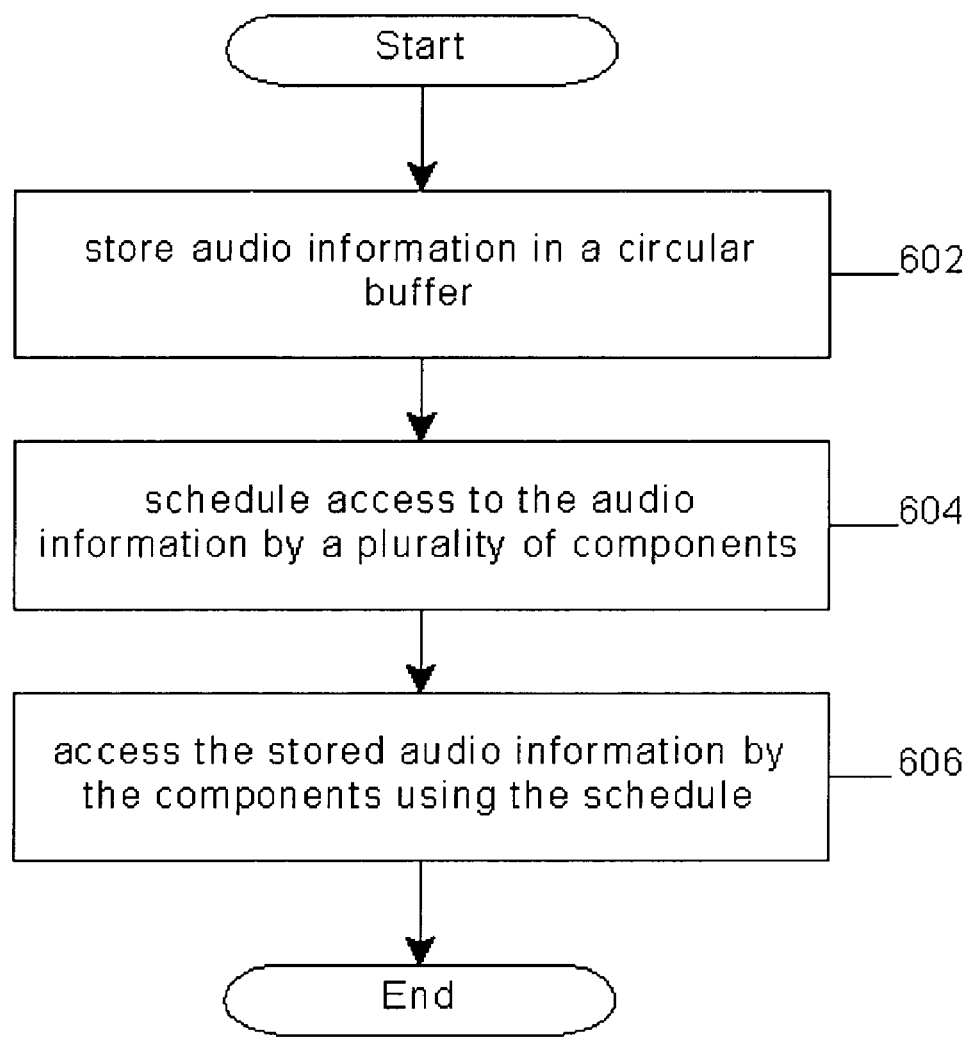
FIG. 6 may illustrate a block flow diagram of the programming logic for a MPM in accordance with one embodiment.

FIG. 6 is a first block flow diagram of the programming logic performed by a MPM in accordance with one embodiment. In one embodiment, this or other modules may refer to the software and/or hardware used to implement the functionality for one or more embodiments as described herein. In this embodiment, this or other modules may be implemented as part of a system, such as MPM 206 of gateway 202. It can be appreciated that this functionality, however, may be implemented by any device, or combination of devices, located anywhere in a communication network and still fall within the scope of the invention.

FIG. 6 illustrates a programming logic 600 to manage a buffer for a network node. As shown in programming logic 600, audio information may be stored in a circular buffer at block 602. Access to the audio information by a plurality of components may be scheduled at block 604. The components may access the stored audio information using the schedule at block 606.

In one embodiment, the storing at block 602 may be accomplished by receiving the audio information. A buffer location to store the received audio information may be identified. The audio information may be stored in the identified buffer location. A determination may be made as to whether the identified buffer location comprises a frame boundary. A first signal may be sent with the frame boundary in accordance with the determination.

In one embodiment, the scheduling at block 604 may be accomplished by receiving the first signal with the frame boundary. Some components may be selected to access the buffer using the frame boundary. A second signal may be sent to the selected components to access the buffer.

In one embodiment, the accessing at block 606 may be accomplished by receiving the second signal. An index to indicate a first buffer location may be retrieved. A frame of audio information may be read from the buffer using the index. The retrieved audio information may be processed. The processed audio information may be written to the buffer. The index may be updated to a second buffer location.

The operation of systems 100, 200, 300 and 500, and the processing logic shown in FIG. 6, may be better understood by way of example. Assume a caller uses call terminal 102 to complete a telephone call connection to call terminal 118. The call may be completed through networks 104, 112 and 116, as well as gateways 106 and 116, for example. Call terminal 102 sends circuit-switched signals over network 104, which are received by gateway 106. Gateway 106 includes PSTN interface cards and technology to convert the circuit-switched signals to packet-switched signals. Part of the conversion process may be accomplished using a MPM, such as MPM 300.

AID 302 may receive the audio information and store the audio information in buffer locations 401-412 of FSS buffer 400 in sequence. AID 302 may generate synchronization signal 320 to SAC 316 when it passes a frame boundary. AID 302 may be configured in accordance with various rules used to schedule access to FSS buffer 400. The components may access frames of audio information stored in FSS buffer 400 in accordance with the schedule.

More particularly, SAC 316 would receive the synchronization signal and frame boundaries and determine which component should access FSS buffer 400 and where the buffer should be accessed. For example, assume that preprocessor 304, EC 306, SDG 308 and AGC 310 are designed to process frames having a frame size of 10 ms. Further assume that encoder 312 is designed to process frames having a frame size of 30 ms. As AID 302 fills FSS buffer 400 and signals SAC 316, SAC 316 determines that buffer location 402 indicates the EB of the first 10 ms frame. SAC 316 determines that according to its scheduling rules, preprocessor 304 is to access FSS buffer 400. SAC 316 sends a control signal to preprocessor 304 to begin accessing FSS buffer 400. The control signal may include the index indicating where preprocessor 304 should access a frame of audio information in FSS buffer 400

SAC 316 may send a control signal to preprocessor 304 to read a 10 ms frame of audio information starting with buffer location 401. Preprocessor 304 may read a 10 ms frame of audio information from buffer locations 401 and 402. Preprocessor 304 may process the 10 ms frame of audio information. Preprocessor 304 may then write the processed audio information back to buffer locations 401 and 402. SAC 316 may update the index for preprocessor 304 to point to the next 10 ms frame in FSS buffer 400, which in this example would be buffer location 403. When preprocessor 304 receives the next control signal to read a 10 ms frame of audio information from FSS buffer 400, it will read the frame from buffer locations 403 and 404.

Once preprocessor 304 processes a frame of information from buffer locations 401 and 402, SAC 316 may send a control signal to EC 306 to read a frame from FSS buffer 400. The index for EC 306 may point to buffer location 401. EC 306 may read the frame from buffer locations 401 and 402. Buffer locations 401 and 402 may hold the audio information already processed by preprocessor 304. EC 306 may read the 10 ms frame of audio information, perform its own processing, and write the 10 ms frame back to buffer locations 401 and 402. SAC 316 may update the index for EC 306 to point to the next 10 ms frame in FSS buffer 400, which in this example would be buffer location 403. When EC 306 receives the next control signal to read a 10 ms frame of audio information from FSS buffer 400, it will read the frame from buffer locations 403 and 404. Similar operations as described with reference to preprocessor 304 and EC 306 may also continue for signal detector 308 and AGC 310.

Eventually, preprocessor 304, EC 306, SDG 308 and AGC 310 will process 3 frames of 10 ms each. At this point, SAC 316 may send a control signal to encoder 312 to access FSS buffer 400. The index for encoder 312 may point to buffer location 401. Encoder 312 may read a 30 ms frame from buffer locations 401-406. Buffer locations 401-406 may hold audio information processed by the previous components in the cascaded data path for MPM 300. Encoder 312 may encode the 30 ms frame of audio information, and send the encoded audio information to network interface 314. Network interface 314 may place the encoded audio information into packets for transport across the rest of network 100. SAC 316 may update the index for encoder 312 to point to the next 30 ms frame in FSS buffer 400, which in this example would be buffer location 407.

As demonstrated above, one or more components of MPM 300 may be accessing different buffer locations for FSS buffer 400 at any given point in time. Further, some components may be reading audio information from FSS buffer 400, some components may be processing audio information, while others may be writing audio information to FSS buffer 400. SAC 316 coordinates these functions to reduce the possibility that audio information may be overwritten or lost, and that multiple components do not attempt to access the same buffer location(s) at the same time.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to manage a buffer, comprising:
receiving audio information;
identifying a buffer location in a circular buffer to store said audio information;
storing said audio information in said buffer location;
determining whether said buffer location is a frame boundary;
sending a first signal with said frame boundary if said buffer location is said frame boundary;
scheduling access to said audio information, wherein said scheduling comprises:
receiving said first signal;
selecting components of a plurality of components to access said circular buffer using said frame boundary, wherein each of the selected components has a frame boundary that corresponds to said frame boundary;
sending a second selected to said selected components to access said circular buffer; and
accessing said stored audio information by said selected components in accordance with said scheduling.

2. The method of claim 1, wherein said accessing by each of said selected components comprises:
receiving said second signal;
retrieving an index to indicate a first buffer location;
reading a frame of audio information from said circular buffer using said index;
processing said read frame of audio information;
writing said processed frame of audio information to said circular buffer; and
updating said index to a second buffer location.

3. An apparatus to perform media processing, comprising:
a circular buffer;
an audio data module connected to said circular buffer;
a plurality of components connected to said circular buffer; and
a scheduling module connected to said audio data module and said plurality of components,
wherein said audio data module receives audio information, identifies a buffer location in said circular buffer to store said audio information, stores said audio information in said buffer location, determines whether said buffer location is a frame boundary, and sends a first signal with said frame boundary if said buffer location is said frame boundary,
wherein said scheduling module generates a schedule of access to said audio information by receiving said first signal, selecting components of the plurality of components to access said circular buffer using said frame boundary wherein each of the selected components has a frame boundary that corresponds to said frame boundary, and sending a second selected to said selected components to access said circular buffer, and
wherein said selected components access said stored audio information in accordance with said generated schedule.

4. The apparatus of claim 3, wherein said plurality of components comprises at least two components of a list of components comprising a preprocessing module, an echo canceller, a signal detector and generator, an automatic gain controller, and a voice encoder.

5. The apparatus of claim 3, wherein said plurality of components comprises at least two components of a list of components comprising a data modem, a signal detector and generator, automatic volume control and voice decoder.

6. The apparatus of claim 3, wherein each of said selected components accesses said stored audio information by receiving said second signal, retrieving an index to indicate a first buffer location, reading a frame of said stored audio information from said circular buffer using said index, processing said read frame of audio information, writing said processed frame of audio information to said circular buffer, and updating said index to a second buffer location.

7. An article comprising:

a storage medium;

said storage medium including stored instructions that, when executed by a processor, result in:

receiving audio information;

identifying a buffer location in a circular buffer to store said audio information;

storing said audio information in said buffer location;

determining whether said buffer location is a frame boundary;

sending a first selected with said frame boundary if said buffer location is said frame boundary;

scheduling access to said audio information, wherein said scheduling comprises:

receiving said first selected;

selecting components of a plurality of components to access said circular buffer using said frame boundary, wherein each of the selected components has a frame boundary that corresponds to said frame boundary;

sending a second selected to said selected components to access said circular buffer; and accessing said stored audio information by said selected components in accordance with said scheduling.

8. The article of claim 7, wherein the stored instructions, when executed by the processor, further result in said accessing by each of said selected components by receiving said second signal, retrieving an index to indicate a first buffer location, reading a frame of audio information from said circular buffer using said index, processing said read frame of audio information, writing said processed frame of audio information to said circular buffer, and updating said index to a second buffer location.

9. A system to process audio information, comprising:

a media gateway;

a media gateway controller; and a media processing device connected to said media gateway and said media gateway controller, said media processing device comprising:

a circular buffer;

an audio data module connected to said circular buffer;

a plurality of components connected to said circular buffer; and a scheduling module connected to said audio data module and said plurality of components, wherein said audio data module receives audio information, identifies a buffer location in said circular buffer to store said audio information, stores said audio information in said buffer location, determines whether said buffer location is a frame boundary, and sends a first signal with said frame boundary if said buffer location is said frame boundary, wherein said scheduling module generates a schedule of access to said audio information by receiving said first signal, selecting components of the plurality of components to access said circular buffer using said frame boundary wherein each of the selected components has a frame boundary that corresponds to said frame boundary, and sending a second selected to said selected components to access said circular buffer, and wherein said selected components access said stored audio information in accordance with said generated schedule.

10. The system of claim 9, wherein each of said selected components accesses said stored audio information by receiving said second signal, retrieving an index to indicate a first buffer location, reading a frame of said stored audio information from said circular buffer using said index, processing said read frame of audio information, writing said processed frame of audio information to said circular buffer, and updating said index to a second buffer location.

* * * * *